US009643871B2

United States Patent
Cowles et al.

(10) Patent No.: US 9,643,871 B2
(45) Date of Patent: May 9, 2017

(54) SUBMERGED COMBUSTION MELTERS AND BURNERS THEREFOR

(71) Applicant: Corning Incorporated, Corning, NY (US)

(72) Inventors: Curtis Richard Cowles, Corning, NY (US); Dale Robert Powers, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/897,933

(22) PCT Filed: Jun. 11, 2014

(86) PCT No.: PCT/US2014/041894
§ 371 (c)(1),
(2) Date: Dec. 11, 2015

(87) PCT Pub. No.: WO2014/201106
PCT Pub. Date: Dec. 18, 2014

(65) Prior Publication Data
US 2016/0130168 A1    May 12, 2016

Related U.S. Application Data

(60) Provisional application No. 61/834,581, filed on Jun. 13, 2013.

(51) Int. Cl.
*C03B 5/235*    (2006.01)
*F23D 14/22*    (2006.01)
(Continued)

(52) U.S. Cl.
CPC ............ *C03B 5/2356* (2013.01); *F23C 3/004* (2013.01); *F23D 14/22* (2013.01); *F23D 14/56* (2013.01);
(Continued)

(58) Field of Classification Search
CPC ............... C03B 5/2356; C03B 2211/22; C03B 2211/23; C03B 2211/60; F23C 3/004;
(Continued)

(56) References Cited

U.S. PATENT DOCUMENTS 3,170,781 A    2/1965 Keefer
3,237,929 A    3/1966 Plumat et al.
(Continued)

FOREIGN PATENT DOCUMENTS

WO    2014085361 A1    6/2015

OTHER PUBLICATIONS

Patent Cooperation Treaty; International Search Report; Jun. 11, 2014; pp. 1-4.

*Primary Examiner* — Jodi C Franklin
(74) *Attorney, Agent, or Firm* — Ryan T. Hardee

(57) ABSTRACT

A submerged combustion melter and burner therefor. The burner may include a first tube having a sealed distal end and a second tube concentric to the first tube, the second tube having a partially sealed distal end with an opening for receiving the first tube, where an annular space is defined between the first and second tubes. The burner further includes a first gas port in the sealed distal end of the first tube, the first gas port supplying a first gas, a second gas port in a distal end of the second tube, the second gas port supplying a second gas to the annular space, and a nozzle on the proximate ends of the first and second tubes. The nozzle provides N first gas outlets and M second gas outlets where the N first gas outlets supply either the first or the second gas into a molten glass environment external the burner, and the M second gas outlets supply either the second or the first gas into the molten glass environment external the burner to thereby mix and combust the first and second gases together in the molten glass environment.

34 Claims, 11 Drawing Sheets

(51) Int. Cl.
*F23C 3/00* (2006.01)
*F23D 14/56* (2006.01)
*F23D 14/58* (2006.01)
*F23D 14/78* (2006.01)

(52) U.S. Cl.
CPC .............. *F23D 14/58* (2013.01); *F23D 14/78* (2013.01); *C03B 2211/22* (2013.01); *C03B 2211/23* (2013.01); *C03B 2211/60* (2013.01); *Y02P 40/55* (2015.11)

(58) Field of Classification Search
CPC .......... F23D 14/22; F23D 14/56; F23D 14/58; F23D 14/78; Y02P 40/55
See application file for complete search history.

(56) References Cited

U.S. PATENT DOCUMENTS

| | | |
|---|---|---|
| 3,260,587 A | 7/1966 | Dolf et al. |
| 3,404,015 A | 10/1968 | Dunbaugh, Jr. |
| 3,563,683 A | 2/1971 | Hess |
| 3,606,825 A | 9/1971 | Johnson |
| 4,203,761 A | 5/1980 | Rose |
| 4,539,034 A * | 9/1985 | Hanneken ................. C03B 3/02 65/134.4 |
| 4,726,760 A * | 2/1988 | Skoog ....................... F23C 7/00 110/265 |
| 5,447,547 A | 9/1995 | Goldfarb et al. |
| 5,944,507 A * | 8/1999 | Feldermann ............ F23C 7/002 239/399 |
| 6,604,937 B1 * | 8/2003 | Mahoney .............. C21C 5/5217 266/222 |
| 6,738,792 B1 | 5/2004 | Muthusamy |
| 6,951,454 B2 * | 10/2005 | Sarv ...................... F23D 1/00 110/262 |
| 7,028,622 B2 * | 4/2006 | Taylor ..................... F23C 6/045 110/263 |
| 7,273,583 B2 | 9/2007 | Rue et al. |
| 8,408,197 B2 * | 4/2013 | Cowles ................... F23C 3/004 126/344 |
| 2005/0236747 A1 * | 10/2005 | Rue ....................... C03B 5/2356 266/217 |
| 2010/0089383 A1 * | 4/2010 | Cowles ................... F23C 3/004 126/360.1 |
| 2016/0060154 A1 * | 3/2016 | Cowles ................. C03B 5/2356 65/134.5 |

* cited by examiner

SUBMERGED COMBUSTION MELTERS AND BURNERS THEREFOR

This application claims the benefit of priority under 35 U.S.C. §371 of International Patent Application Serial No. PCT/US14/41894, filed on Jun. 11, 2014, which claims the benefit of priority to U.S. Application 61/834,581 filed on Jun. 13, 2013 the content of each are incorporated herein by reference in their entirety.

BACKGROUND

In a conventional glass melter, burners are located above the surface of glass materials in the melter (e.g., the glass batch materials and later the melted glass materials, or collectively the "glass melt") and are directed downwardly toward the top surface of glass melt. In an effort to increase the thermal efficiency of glass melters, burners may also be located below the surface of the glass melt and fired up into the glass melt in what has been referred to as submerged combustion melting or a submerged combustion melter (SCM).

FIG. 1 is a schematic illustration of a conventional SCM apparatus 71 having a melting chamber 72 containing a molten pool of glass melt 74. With reference to FIG. 1, the melting chamber 72 includes a feed port 76 for feeding glass batch material from a hopper 75 into the melting chamber 72. The batch material may be provided in liquefied, granular or powdered form. The melting chamber 72 also includes an exhaust port 78 through which exhaust gases may escape the melting chamber 72. The melting apparatus 71 also includes a conditioning chamber 80 connected to the melting chamber 72 by an outlet or flow passage 82. Molten material from the molten pool 74 flows from the melting chamber 72 to the conditioning chamber 80 through the flow passage 82 and then exits the melting apparatus 71. One or more orifices 86 may be formed in the bottom wall 88 of the melting chamber 72 whereby burners 10 inject flames into the molten pool of glass melt 74. In alternative arrangements, the orifices 86 may be provided in one or more side wall 90 of the melting chamber 72 and/or may be perpendicular or slanted relative to the wall of the melting chamber 72.

In an SCM apparatus the flame and products of the combustion (e.g., carbon dioxide and water, to name a few) travel through and directly contact the glass melt transferring heat directly to the glass melt and resulting in a more efficient heat transfer to the glass melt than in conventional glass melters. More of the energy from the combustion may be transferred to the glass melt in an SCM apparatus than in a conventional glass melter. Further, the flame and products of the combustion travelling through the glass melt in an SCM apparatus may also agitate and mix the glass melt, thereby enabling the glass melt to be mixed without use of mechanical mixers typically required in conventional glass melters. The glass melt in a conventional glass melter is also not significantly stirred by the presence of the burner and flame above the surface of the glass material without the aid of mechanical mixers, such as mixing blades. Use of such mechanical mixers in conventional glass melters is problematic. For example, as a result of high temperatures in and the corrosive nature of the glass melt, mechanical mixers in glass melters possess a short useful life and replacement thereof is expensive. As a mechanical mixer in a conventional glass melter degrades, material from the mixer may contaminate the glass melt.

SUMMARY

The present disclosure generally relates to submerged combustion melting. More specifically, the present disclosure relates to burners for submerged combustion melting employing nozzles that create a flared flame. An exemplary submerged combustion melting apparatus according to embodiments of the present disclosure can enable glass melt to be melted and homogenized in smaller volumes and shorter times than in conventional glass melters without the use of conventional mechanical mixers. The improved heat transfer and smaller size of such an SCM apparatus may also lower energy consumption and capital costs compared to conventional glass melters.

Some embodiments include a burner for a submerged combustion melter. The burner can include a first tube having a sealed distal end, a second tube concentric to the first tube, the second tube having a partially sealed distal end with an opening for receiving the first tube, where an annular space is defined between the first and second tubes. The burner can also include a first gas port in the sealed distal end of the first tube, the first gas port supplying a first gas, a second gas port in a distal end of the second tube, the second gas port supplying a second gas to the annular space, and a nozzle on the proximate ends of the first and second tubes. The nozzle can have N first gas outlets and M second gas outlets whereby the N first gas outlets supply either the first or the second gas into a molten glass environment external the burner, and the M second gas outlets supply either the second or the first gas into the molten glass environment external the burner to thereby mix and combust the first and second gases together in the molten glass environment.

Additional embodiments of the present disclosure include another burner for a submerged combustion melter. The burner can have a first tube having a sealed distal end, a second tube concentric to the first tube, the second tube having a partially sealed distal end with an opening for receiving the first tube, where an annular space is defined between the first and second tubes. The burner can also include a first gas port in the sealed distal end of the first tube, the first gas port supplying a first gas, a second gas port in a distal end of the second tube, the second gas port supplying a second gas to the annular space, and a nozzle on the proximate ends of the first and second tubes. An exemplary nozzle can include one or more first gas outlets for delivering a fuel to a molten glass environment and one or more second gas outlets for delivering an oxidizer to the molten glass environment where at least one of the first or second gas outlets is inclined by more than 30° from a longitudinal axis of the first tube.

Further embodiments of the present disclosure include an additional burner for a submerged combustion melter. This burner can include a first tube having a sealed distal end, a second tube concentric to the first tube, the second tube having a partially sealed distal end with an opening for receiving the first tube, where an annular space is defined between the first and second tubes. The burner can also have a first gas port in the sealed distal end of the first tube, the first gas port supplying a first gas, a second gas port in a distal end of the second tube, the second gas port supplying a second gas to the annular space, and a nozzle on the proximate ends of the first and second tubes. The nozzle can have a first plurality of gas outlets for delivering a fuel to a molten glass environment and a second plurality of gas outlets for delivering an oxidizer to the molten glass environment where each of the first plurality of gas outlets are inclined by more than 30° from a longitudinal axis of the first tube and each of the second plurality of gas outlets are inclined by more than 30° from the longitudinal axis of the first tube.

Yet another embodiment of the present disclosure provides a submerged combustion melter system. The system can include a melting chamber having a molten pool of glass melt, a feed port for feeding glass material into the melting chamber, an exhaust port through which exhaust gases can escape the melting chamber, a conditioning chamber operably connected to the melting chamber by an outlet passage whereby molten material from the molten pool flows from the melting chamber to the conditioning chamber through the outlet passage and then exits the melting apparatus, and one or more burners constrained in a wall of the melting chamber to inject flames into the molten pool of glass melt. Exemplary burners can include a first tube having a sealed distal end and a second tube concentric to the first tube, the second tube having a partially sealed distal end with an opening for receiving the first tube, wherein an annular space is defined between the first and second tubes. The burner can also include a first gas port in the sealed distal end of the first tube, the first gas port supplying a first gas, a second gas port in a distal end of the second tube, the second gas port supplying a second gas to the annular space, and a nozzle on the proximate ends of the first and second tubes. An exemplary nozzle can include a first plurality of first gas outlets and a second plurality of second gas outlets, where the plurality of first gas outlets supply either the first or the second gas, the plurality of second gas outlets supply either the second or the first gas to thereby mix the first and second gases together, and at least one of the plurality of first or second gas outlets is inclined by more than 30° from a longitudinal axis of the first tube.

One embodiment of the present disclosure provides a burner mechanism or apparatus for a submerged combustion melting system having a series of holes to emit the fuel drilled at an angle to vertical. The burner can also include a further set of holes drilled so that a stream of oxygen impinges on each of the fuel gas flows to thereby enhance the mixing of the fuel and the oxygen.

Additional embodiments of the present disclosure provide a burner mechanism or apparatus for a submerged combustion melting system having holes made substantially larger at the surface than holes on the interior of the burner. In exemplary embodiments, these smaller holes can limit the flow of the gas (either fuel or oxygen) whereby the gas reduces its velocity when it reaches the larger hole.

In another embodiment of the present disclosure, fuel and oxygen holes in an exemplary burner mechanism can be drilled so the gases escaping therefrom impinge and merge before reaching the surface of the burner to thereby further enhance the mixing of fuel and oxygen.

DETAILED DESCRIPTION

With reference to the figures, where like elements have been given like numerical designations to facilitate an understanding of the present disclosure, the various embodiments for submerged combustion melters and burners therefor are described.

The following description of the present disclosure is provided as an enabling teaching thereof and its best, currently-known embodiment. Those skilled in the art will recognize that many changes may be made to the embodiment described herein while still obtaining the beneficial results of the present disclosure. It will also be apparent that some of the desired benefits of the present disclosure may be obtained by selecting some of the features of the present disclosure without utilizing other features. Accordingly, those of ordinary skill in the art will recognize that many modifications and adaptations of the present disclosure are possible and may even be desirable in certain circumstances and are part of the present disclosure. Thus, the following description is provided as illustrative of the principles of the present disclosure and not in limitation thereof.

Those skilled in the art will appreciate that many modifications to the exemplary embodiments described herein are possible without departing from the spirit and scope of the present disclosure. Thus, the description is not intended and should not be construed to be limited to the examples given but should be granted the full breadth of protection afforded by the appended claims and equivalents thereto. In addition, it is possible to use some of the features of the present disclosure without the corresponding use of other features. Accordingly, the foregoing description of exemplary or illustrative embodiments is provided for the purpose of illustrating the principles of the present disclosure and not in limitation thereof and may include modification thereto and permutations thereof.

Figure 1:
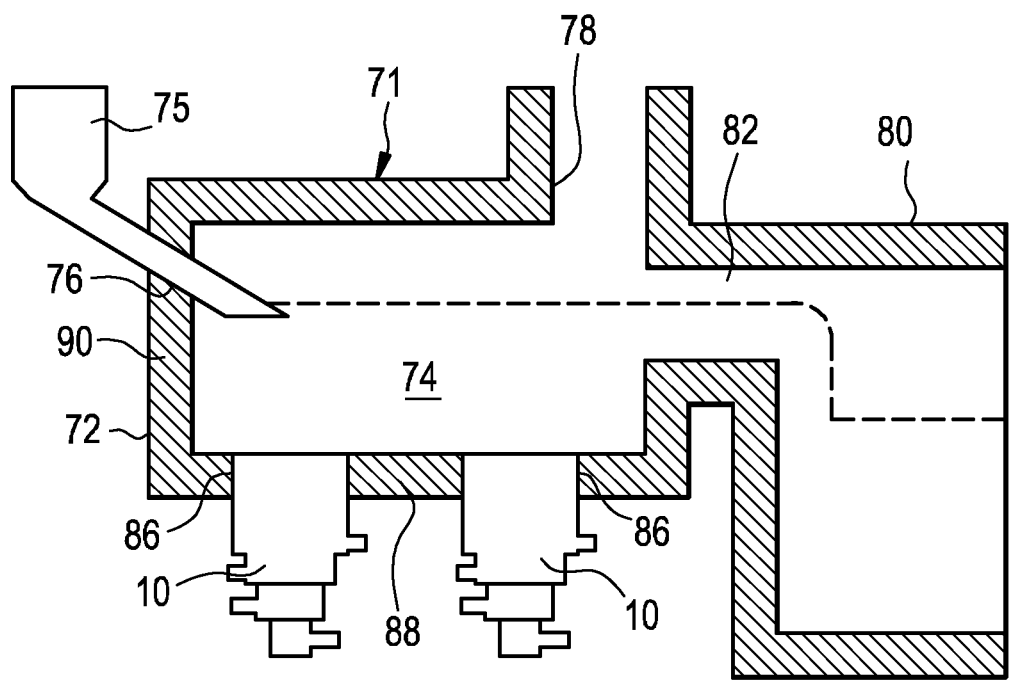
FIG. 1 is schematic illustration of a conventional submerged combustion melting system.
Figure 2:
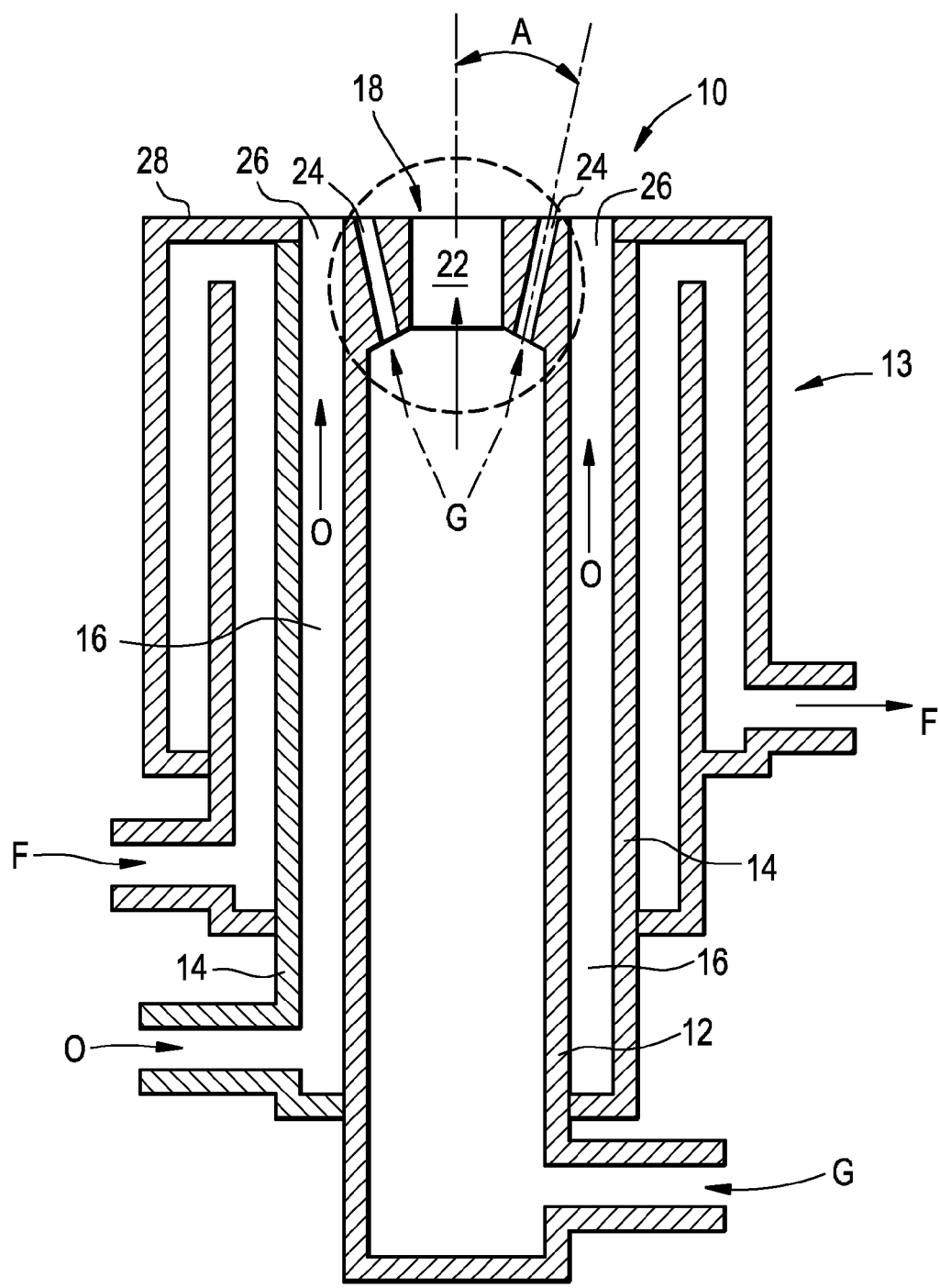
FIG. 2 is a cross-sectional view of an exemplary burner for a submerged combustion melter according to an embodiment of the present disclosure.

FIG. 2 is a cross-sectional view of a burner for a submerged combustion melter (SCM) according to an embodiment of the present disclosure. An exemplary SCM can include a melting chamber 72 having a molten pool of glass melt as depicted in FIG. 1. This melting chamber 72 can include a feed port for feeding glass batch material from a hopper into the melting chamber. The melting chamber 72 can also include an exhaust port through which exhaust gases can escape the melting chamber. A conditioning chamber can be provided in the SCM connected to the melting chamber 72 by an outlet or flow passage as depicted in FIG. 1 whereby molten material from the molten pool flows from the melting chamber 72 to the conditioning chamber through the flow passage and then exits the melting apparatus. One or more orifices can be formed in the bottom and/or side walls of the melting chamber 72 whereby exemplary burners inject flames into the molten pool of glass melt. With reference to FIG. 2, an exemplary SCM burner 10 can include two concentric tubes, e.g., a central tube 12 and an outer tube 14. The central tube 12 can deliver a fuel gas G to a nozzle 18, and the outer tube 14 can deliver oxygen O to the burner for combustion of the fuel gas G exiting the nozzle. The outer tube 14 can form part of a cooling jacket 13 surrounding the central and outer tubes 12 and 14. The nozzle 18 can have a central gas outlet 22 and a plurality of outer gas outlets 24 (e.g., six holes, etc.) arranged around the central gas outlet 22. Passages leading to the outer gas outlets 24 can be inclined outwardly from a longitudinal central axis of the central tube 12 at a gas exit or egress angle A. Exemplary egress angles can be, but are not limited to, between approximately 25° and approximately 65°. Oxygen can then exit the burner through an annular oxygen outlet 26 formed between the inner surface of the outer tube 14 and the outer surface of the central tube 12. Fuel gas G exiting the outer gas outlets 24 is directed along the gas exit angle A toward and mixes with the oxygen O exiting the oxygen outlet 26 so that the gas combusts generating a flame (not shown) is fired vertically upward into and through the glass melt (not shown). The burner 10 can be operated with the top of the nozzle 18 and the central tube 12 flush with the top of the outer tube or recessed about 1½ inches below the top of the outer tube 14 (and the top end 28 of the burner) so that the fuel gas G can mix with the oxygen O before reaching the top end of the burner. A cooling fluid F can then be circulated through the cooling jacket 13 to cool the burner.

The flame travelling vertically though the glass melt in such a SCM from the burner 10 can entrain a large amount of glass melt and can spray the glass melt onto the sides the melter (not shown). Some of the entrained glass melt can even be sprayed into the air exhaust system of the melter. The entrained glass melt can then harden on and coat the upper walls of the melter and the exhaust system, including observation ports, sensor locations, exhaust ducts, etc. Entrained molten glass material can also collect in and on the filter system of a pollution abatement system (bag house, filter, etc.) thereby fouling the filter system. Additionally, combustion products can break through the surface of the glass melt in large "burps" flinging some of the glass melt upwards resulting in the deposition of unmelted and/or insufficiently mixed molten glass material toward, near or on the glass exit of the melter or "tap" (not shown). Occasionally some of this unmelted or insufficiently mixed glass melt can exit the tap along with the desired fully melted and mixed glass melt, which is undesirable. The high velocity of the combustion products in a typical SCM burner can also result in the formation of a large number of gas bubbles in the melt. For many applications it is necessary to remove these gas bubbles in a "fining" stage. During fining, glass should be held at a temperature high enough for the bubbles to rise in the glass melt for removal thereof thereby creating a large energy demand. Such an SCM burner can also generate a very loud piercing sound when operated with some glass compositions resulting in a noise level reaching about 90 dB to 100 dB or more and creating a threat to operators' hearing.

Figure 3:
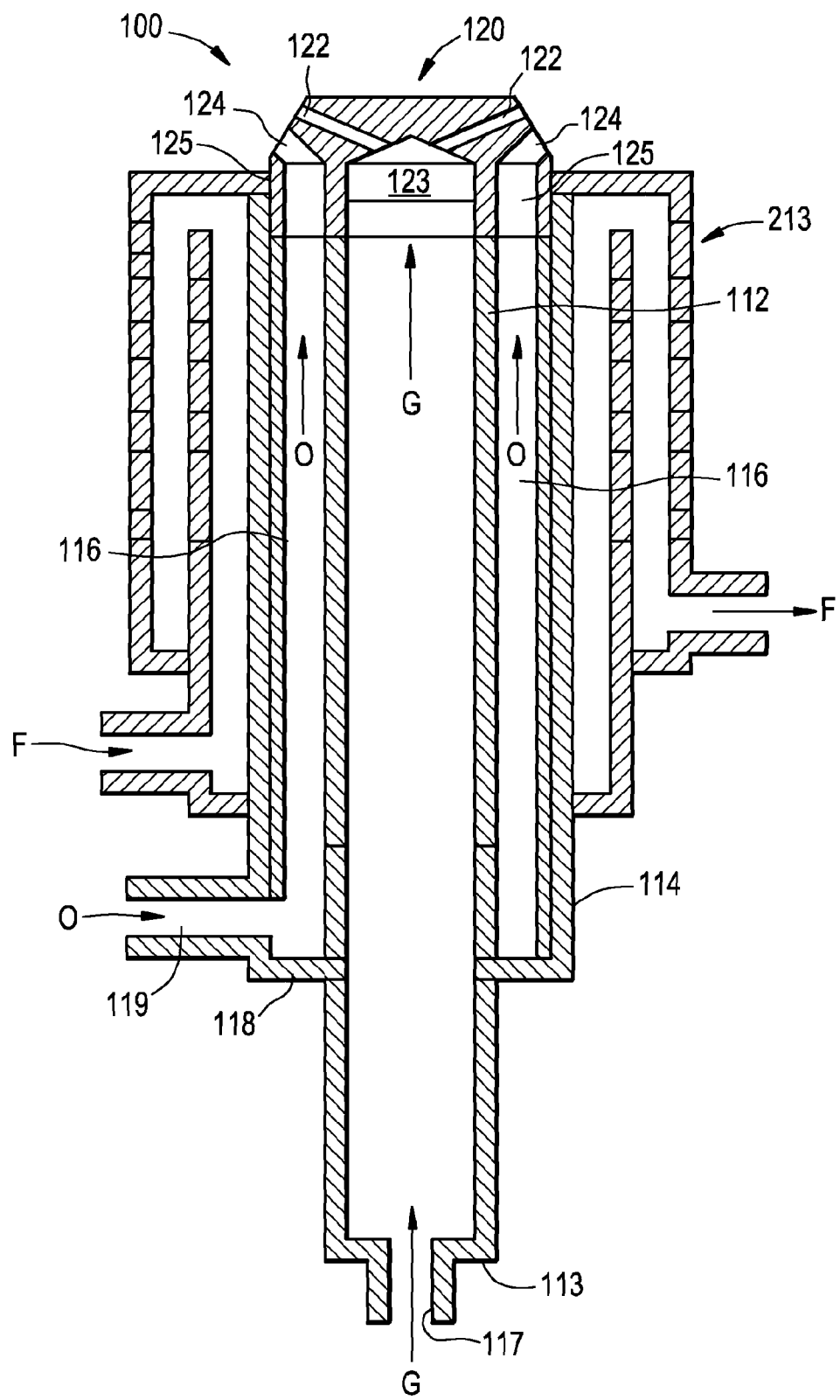
FIG. 3 is a cross-sectional view of an exemplary burner for a submerged combustion melter according to a further embodiment of the present disclosure.

FIG. 3 is a cross-sectional view of a burner for a submerged combustion melter according to a further embodiment of the present disclosure. With reference to FIG. 3, another burner 100 for an exemplary SCM according can include a hollow first or central tube 112 and a hollow second or outer tube 114. An annular space 116 can be defined between the central and outer tubes 112, 114. In some embodiments the central and outer tubes 112, 114 can be concentric. The central tube 112 can have a first closed bottom or distal end 113 sealing the distal end thereof, and the outer tube 114 can have a partially closed bottom or distal end 118 with an opening therethrough for receiving the central tube 112. The partially closed bottom or distal end 118 of the outer tube 114 can thus seal the distal end of the annular space 116 by extending between the outer tube 114 and the central tube 112. In the embodiment depicted in FIG. 3, a bottom portion of the central tube 112 can extend below the distal end 118 of the outer tube 114. The central tube 112 can, in some embodiments, slide relative to the opening in the distal end 118 of the outer tube 114 so adjustment of the vertical position of the central tube 112 relative to that of the outer tube 114 is possible. A first gas port 117 in the distal end 113 of the central tube 112 can communicate with the interior of the central tube. The outer tube 114 can also include a second gas port 119 in communication with the interior of the outer tube 114, e.g., with the annular space 116 between the outer and central tubes 112, 114. A cooling jacket 213 can be provided to the burner 100 for cooling purposes whereby cooling fluid F is supplied to the cooling jacket 213.

Figure 4:
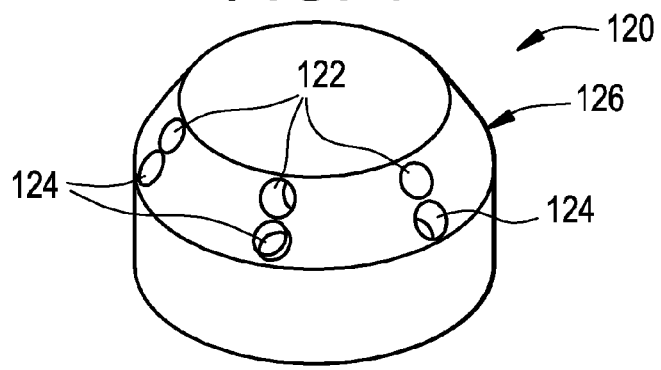
FIG. 4 is a perspective view of the nozzle of the burner of FIG. 3.
Figure 5:
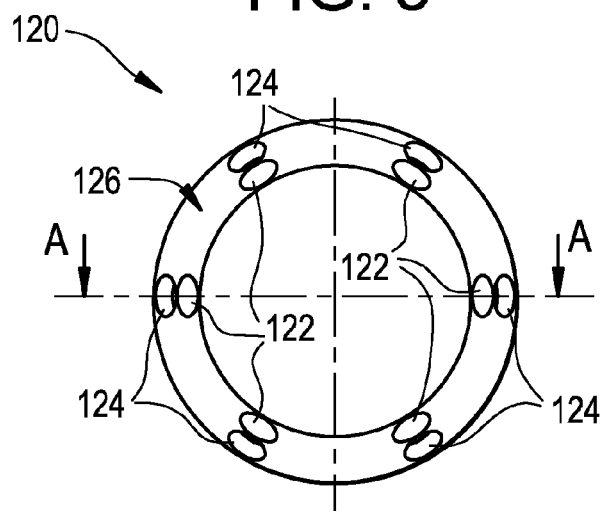
FIG. 5 is a top view of the nozzle of FIG. 4.
Figure 6:
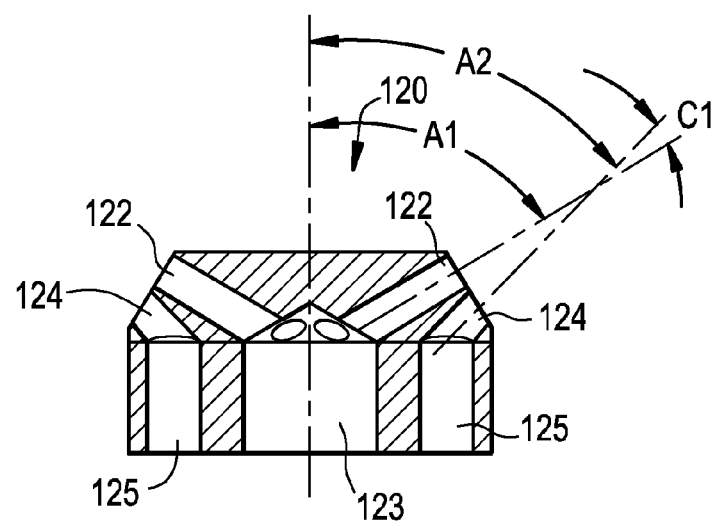
FIG. 6 is a cross-sectional view of the nozzle of FIG. 5 along line A-A.

In some embodiments a nozzle 120 can be mounted to or formed on the top or proximate ends of the central tube 112 and/or the outer tube 114. FIG. 4 is a perspective view of the nozzle of the burner of FIG. 3, FIG. 5 is a top view of the nozzle of FIG. 4, and FIG. 6 is a cross-sectional view of the nozzle of FIG. 5 along line a-a. With reference to FIGS. 3-6, an exemplary nozzle 120 can include a plurality "n" of upper gas outlets 122 (for example, n=one, two, three, four, five, six, seven, eight, etc. outlets) formed by a plurality of upper bores or channels in the nozzle 120. The upper gas outlets 122 can be arranged around a central longitudinal axis of the central tube 112. In some embodiments, the upper gas outlets 122 can be concentrically arranged about the longitudinal axis of the central tube 112. In other embodiments, the upper gas outlets 122 can be arranged in one or more rings about the longitudinal axis, any of the rings having a different elevation than another (not shown). In alternative embodiments, the arrangement of the upper gas outlets can be random. A first central feed channel or central feed bore 123 in an exemplary nozzle 120 can provide communication between the upper gas outlets 122 and the interior of the central tube 112. A plurality "m" of lower gas outlets 124 (for example, m=one, two, three, four, five, six, seven, eight, etc. outlets) can be formed by a plurality of lower bores or channels in the nozzle. In some embodiments, m=n. In other embodiments, m≠n, m≤n, m≥n. The lower gas outlets 124 can also be arranged around the longitudinal central axis of the central tube 112. In some embodiments, the lower gas outlets 124 can be concentrically arranged about the longitudinal axis of the central tube 112. In other embodiments, the lower gas outlets 124 can be arranged in one or more rings about the longitudinal axis, any of the rings having a different elevation than another (not shown). In alternative embodiments, the arrangement of the lower gas outlets can be random. In additional embodiments, the upper and lower gas outlets 122, 124 can be provided in adjacent and/or alternating rings arranged about the longitudinal axis of the central tube 112. One or more second or outer feed bores or channels 125 can communicate the lower gas outlets 124 with the annular space 116 in the outer tube 114.

In one embodiment, the upper and lower gas outlets 122, 124 can be arranged in a plurality of gas outlet pairs (e.g., one, two, three, four, five, six, seven, eight, etc. outlet pairs) with a gas outlet pair including an upper gas outlet 122 and an adjacent lower gas outlet 124. In another embodiment, the upper and lower gas outlets in a pair can be inclined toward or away from each other. In a non-limiting example, each upper and lower gas outlet pair can be aligned to each other in a plane parallel to the longitudinal axis of the central tube 112. In another example depicted in FIGS. 4-6, each upper and lower gas outlet pair can be aligned to each other in a plane offset or inclined from the longitudinal axis of the nozzle 120 and the central tube 112 at an egress angle A1. In a non-limiting embodiment, A1 can be about 60°. The lower gas outlets 122 can also be inclined outwardly from the longitudinal axis of the nozzle 120 and central tube 112 at an egress angle A2. In a non-limiting embodiment, A2 can be about 45°. The aforementioned angles are, of course, exemplary only and should not limit the scope of the claims appended herewith as any angle of egress angles A1, A2 are envisioned with embodiments of the present disclosure. It should be noted, however, that A1 and A2 should be determined such that gas exiting the upper gas outlets converges with gas exiting the lower gas outlets at an angle of convergence C1. In a non-limiting embodiment, C1 can be approximately 15°. Of course, the aforementioned angle for C1 is exemplary only and should not limit the scope of the claims appended herewith as any angle of convergence is envisioned with embodiments of the present disclosure.

In operation, an external source of a pressurized first gas (not shown), e.g., a source of fuel gas, natural gas, etc., can be connected to the first port 117 by a first gas supply line or conduit (not shown) to supply a flow of the first gas to the central tube 112. An external source of a pressurized second gas (not shown), e.g., a source of oxidant gas, oxygen, or the like, can be connected to the second port 119 by a second gas supply line or conduit (not shown) to supply a flow of the second gas to the outer tube 114. A stream of the first gas G can exit each of the upper gas outlets 122 along the first egress angle A1, and a stream of the second gas O can exit each of the lower gas outlets 124 along the second egress angle A2. At each gas outlet pair, a stream of the first gas G exiting the upper gas outlet 122 can thus converge and mix with a stream of the second gas O exiting the lower gas outlet 124. The mixed gasses can then be ignited and combust forming a flame traveling up and away from the nozzle 120. The direction of such flame can, in some embodiments, be in a direction between the first and second egress angles A1, A2. The nozzle 120 can thus produce a ring of flames flaring out from the nozzle. This flaring can cause the momentum of the combustion gases to be more horizontal, diffused and spread out in the glass melt as compared to conventional SCM burners thereby reducing vertical velocity and momentum of combustion gases travelling through the glass melt. This reduction in vertical velocity and momentum of combustion gases travelling through the glass melt can thus reduce the flinging of the glass described above. In some embodiments, a short broad flame can also help reduce or eliminate formation of a cold spot in the molten pool just above the nozzle to avoid freezing of the glass melt at this point. In some embodiments, it can be desirable to exchange or alternate fuel and oxygen inlets, i.e., instead of the second port 119 being used for oxygen, it can be used for fuel and simultaneously, instead of the first port 117 being used for fuel, it can be used for oxygen.

Figure 7:
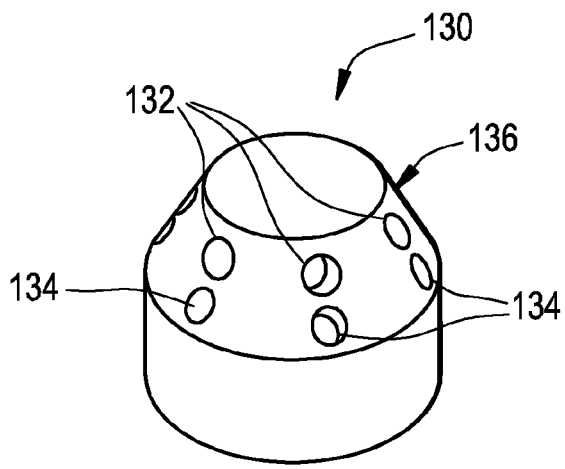
FIG. 7 is a perspective view of an exemplary nozzle according to a further embodiment of the present disclosure.
Figure 8:
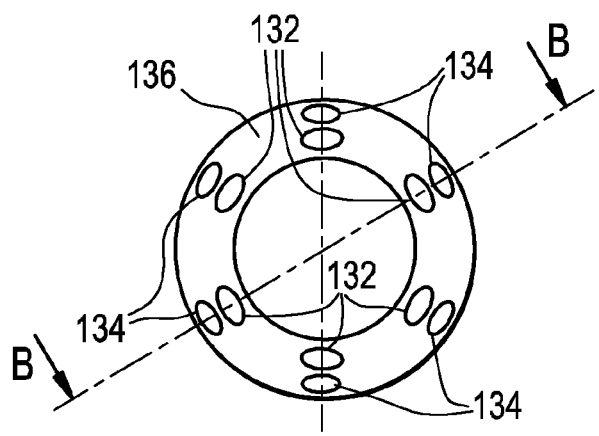
FIG. 8 is a top view of the nozzle of FIG. 7.
Figure 9:
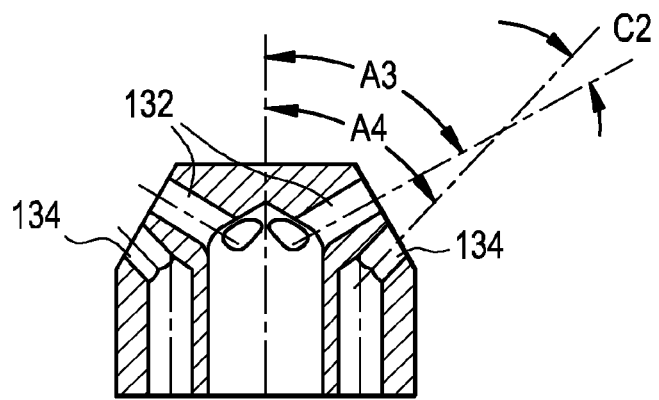
FIG. 9 is a cross-sectional view of the nozzle of FIG. 8 along line B-B.

In additional embodiments, the egress angle A1 of the upper gas outlets, the egress angle A2 of the lower gas outlets, and the resulting angle of convergence C1 for the first gas outlets relative to the second gas outlets can also vary. FIG. 7 is a perspective view of a nozzle according to a further embodiment of the present disclosure, FIG. 8 is a top view of the nozzle of FIG. 7, and FIG. 9 is a cross-sectional view of the nozzle of FIG. 8 along line B-B. With reference to FIGS. 4-9, the first egress angle A1, A3 of exemplary upper gas outlets can be in a range of from about 20° to about 80°. The second egress angle A2, A4 of the lower gas outlets can be in a range of from about 10° to about 70°. It follows, that with the aforementioned ranges of A1, A2, A3, A4, the convergence angle C1, C2 of the upper and lower gas outlets can in a range of from about 0° to about 60°. In a preferred embodiment, the convergence angle C1, C2 of the upper and lower gas outlets can be from about 10° to about 40°. In yet another embodiment, the convergence angle C1, C2 of the upper and lower gas outlets can be from about 15° to about 35°. The first and second gas outlets can also be provided with a lateral angle from the longitudinal axis of the nozzle, e.g., have a horizontal component to reduce vertical component of the momentum of gases being emitted. For example, a lateral aspect of the egress angles of the upper gas outlets and the lower gas outlets can be about 10° from or toward each other.

In some embodiments of the present disclosure, the size of the upper and/or lower gas outlets can vary. The selection of outlet size can, in some embodiments, be based on the amount of heat that a burner is to produce in conjunction with the available gas pressures of the fuel and oxygen. The burners as described herein can be capable of a considerable range of heat production, e.g., a factor of 2 from the lowest practical rate to the highest practical rate and can thus produce between 150 and 450 KW (e.g., about 0.5 to 1.5 million BTU/hr) with a natural gas pressure of between 10-20 psig and oxygen pressure of between 15-35 psig. In operation, about a 15% excess of oxygen can be employed to fully oxidize the fuel. For example, the nozzle 120 depicted in FIGS. 4-6 can have upper and lower gas outlets 122, 124 each with a diameter of about 0.0995 inches thereby resulting in a burner producing upwards of approximately 250 KW of heat. By way of further example, the nozzle 130 depicted in FIGS. 7-9 can have upper gas outlets 132 with a diameter of about 0.154 inches and lower gas outlets 134 with a diameter of about 0.136 inches thereby resulting in a burner producing upwards of approximately 350 KW.

Figure 10:
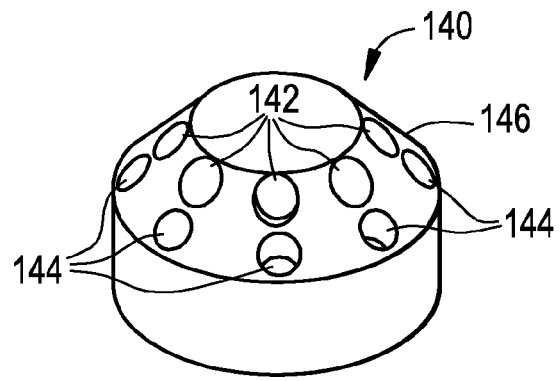
FIG. 10 is a perspective view of an exemplary nozzle according to an additional embodiment of the present subject matter.
Figure 11:
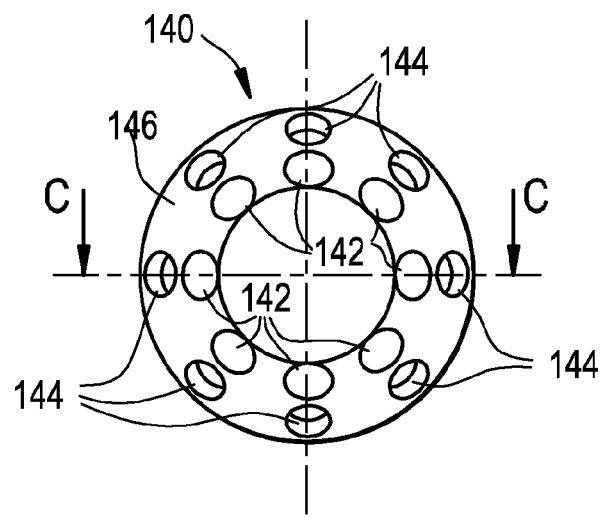
FIG. 11 is a top view of the nozzle of FIG. 10.
Figure 12:
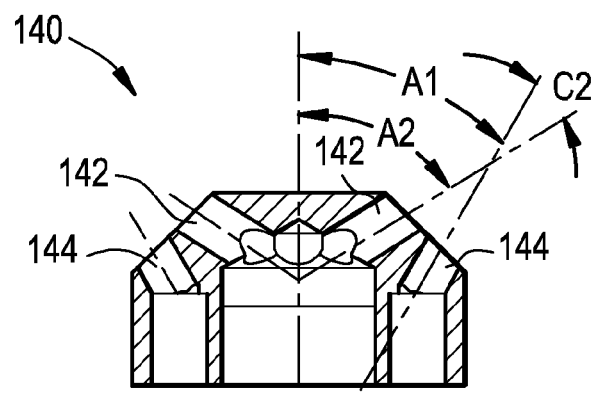
FIG. 12 is a cross-sectional view of the nozzle of FIG. 11 taken along line C-C.

FIG. 10 is a perspective view of a nozzle according to an additional embodiment of the present subject matter, FIG. 11 is a top view of the nozzle of FIG. 10, and FIG. 12 is a cross-sectional view of the nozzle of FIG. 11 taken along line C-C. With reference to FIGS. 10-12, a burner is depicted having a nozzle 140 with upper gas outlets 142 having an approximate diameter 0.154 inches and lower gas outlets 144 having an approximate diameter of 0.136 inches thereby resulting in a burner producing upwards of over 450 KW. The upper gas outlets 122, 132 and 142 depicted in FIGS. 4-12 and the lower gas outlets 124, 134 and 144 also depicted in these figures can, in some embodiments, be provided with relatively small cross-sections to provide an increased velocity of the streams of both the first gas G and/or second gas O exiting therefrom. In another non-limiting embodiment, any one or several of the upper and lower gas outlets, 122, 124, 132, 134, 142, 144 can have a varying diameter through the length of the respective outlet. For example, the outlet can possess a larger diameter closer to the longitudinal centerline of the nozzle and a progressively smaller diameter farther from the longitudinal centerline resulting in an increased velocity of any gas exiting therefrom. By way of a non-limiting example, upper and lower gas outlets can be formed with a diameter in a range from about 0.03 inch to about 0.3 inches resulting in a gas (O or G) exit velocity in an approximate range from about 80 m/s and to about 330 m/s when supplied to the central tube and the outer tube at a pressure in a range from about 5 psig to 50 psig. Of course, the size, number, diameters, angles, etc. of exemplary gas outlets can vary widely depending upon the desired energy output of the burner, and it is envisioned that the claims appended herewith should not be so limited to any specific size, number, diameter, angle, etc. unless so claimed.

In some embodiments, the upper and lower gas outlets in each pair of gas outlets can be situated substantially adjacent to one another thereby ensuring that exiting streams of gasses are close enough to promote rapid mixing of thereof for combustion of the gasses in close proximity to the nozzle. The mixed gas exiting a nozzles can thus be ignited such that flames are generated travelling away from the nozzle within the glass melt and flare out and away from the longitudinal axis of the central tube. This flaring of the flames can result in the momentum of the combustion gases to be more horizontal, diffused and spread out in the glass melt as compared to conventional SCM burners. This flaring can also reduce vertical velocity and momentum of combustion gases travelling through the glass melt thereby reducing the flinging of the glass as compared to conventional SCM burners. In additional embodiments, a short, broad flame can also reduce or eliminate formation of a cold finger in the molten pool and avoid freezing of the glass melt at the point where the flame is injected into the glass melt. Flow regulators (not shown) can be employed in embodiments of the present disclosure to control the flow rate of the first and second gasses in the respective supply lines (e.g., selection of pressure, etc.).

An exemplary central tube 112, outer tube 114 and nozzle 120, can be made of any suitable heat-resistant material such as, but not limited to, stainless steel, e.g., 304, 309, 316, or other high temperature stainless steel, austenitic nickel-chromium-iron alloys, e.g. Inconel®, a high temperature glass such as fused silica, a high temperature ceramic, or a high temperature plastic such as PVC (polyvinylchloride) or polyimide. In other embodiments, the first port 117 and the second port 119 can be located in the side walls or the bottom walls of the central 112 and outer 114 tubes. With continued reference to FIGS. 4-12, exemplary nozzles 120, 130, 140 are illustrated with the upper gas outlets 122, 132, 142 and lower gas outlets 124, 134, 144 located in a frustoconical section 126, 136, 146 having a plane in which one or more of the upper and lower gas outlets are positioned. In other embodiments, the nozzle can be a cylindrical extension of the central tube 112, with the upper and lower gas outlets being located in the peripheral cylindrical wall of the nozzle.

While the present disclosure and figures heretofore have described and illustrated gas outlet pairs as being vertically or longitudinally aligned pairs, it will be appreciated that each of the gas outlets pairs can be aligned along a plane perpendicular, inclined or parallel to the longitudinal axis of the nozzle and the central tube with both the upper and lower gas outlets being arranged in the same ring or circle around the nozzle. Each of the gas outlet pairs can alternatively be aligned along a plane at any angle from parallel to perpendicular to the longitudinal axis of the nozzle and the central tube. Further, the number of pairs of gas outlets can vary. For example, the nozzle 140 illustrated in FIGS. 10-12 is the same as the nozzle of FIGS. 4-6, except that the nozzle 140 includes eight pairs of upper and lower gas outlets 142, 144. It should be noted that the number and arrangement of pairs of upper and lower gas outlets in the nozzles depicted in FIGS. 4-12 should not limit the claims appended herewith.

Different versions of burners with nozzles as previously described herein in relation to FIGS. 4-12 were tested in an exemplary SCM. The dimensions of the gas outlets in the tested nozzles are listed below in Table 1.

TABLE 1

| Burner # | FIG. # | # of hole pairs | Diameter of upper outlets (in) | Diameter of lower outlets (in) | Diameter of outer bore (in) | Inner Diameter of center bore (in) |
|---|---|---|---|---|---|---|
| 1 | 4 | 6 | 0.0995 | 0.0995 | 0.375 | 0.305 |
| 2 | 7 | 6 | 0.136 | 0.0995 | 0.375 | 0.305 |
| 3 | 7 | 6 | 0.154 | 0.136 | 0.375 | 0.305 |
| 4 | 10 | 8 | 0.154 | 0.136 | 0.500 | 0.430 |

With reference to Table 1, upper gas outlets were used during the experiment for the flow of oxygen and the lower gas outlets were used for the flow of natural gas. Burner 1, having the smallest gas outlets, was limited to a flow rate of about 1300 SCFH of oxygen at a delivery pressure of 15 psig. Natural gas flow rate of about 600 SCFH through Burner 1 yielded a heat output of 175 KW. Under these conditions, about 50 pounds/hr of alumino-silicate glass, high viscosity glass or other suitable glass material. Very good temperature uniformity of the glass melt was achieved using Burner 1 arrangements, and the glass melt was characterized as being well behaved in that a significant amount of glass was not flung on the sides of the SCM. In general Burner 1 did not emit a significant amount of sound, under most conditions any sound generated could not be heard above the background noise. Burner 3 was also tested in an SCM whereby an oxygen flow rate of 1800 SCFH was achieved at a delivery pressure of 16 psig through the upper gas outlets. A natural gas flow rate of about 800 SCFH was achieved through the lower gas outlets. The resulting flame yielded a heat output of about 235 KW. Under these conditions about 75 pounds/hr of glass was melted. The oxygen flow was somewhat limited by the relatively small size of bore communicating the upper gas outlets with the interior of the central tube. Burner 3 was also very quiet and did not fling glass around the SCM. The glass melt emitted from the tap of the furnace was uniformly melted, and the temperature uniformity of the glass melt produced by Burner 3 was similar to that of many other burners. By having larger gas outlet hole sizes than Burner 1, Burner 3 can be able to pass more oxygen at a given pressure, but the velocity of the oxygen exiting the burner was only about 196 m/s at 1800 SCFH, less than the 330 m/s of the oxygen being emitted from Burner 1 at 1300 SCFH oxygen flow. The higher velocity of the oxygen from Burner 1 likely contributed to better mixing of glass and resulted in better temperature uniformity. Burner 3 could pass higher maximum flow of oxygen and thus have a higher oxygen velocity if the bore communicating the upper gas outlets with the interior of the central tube was made larger.

One surprising result is there were no observed problems with Burners 1 and 3. Conventional wisdom would expect that Burners 1 and 3 would cause glass to be deposited on the top thereof possibly plugging such burners that do not have gas outlets exiting vertically upwards in the center of the nozzles. The disadvantage of having such vertically-oriented gas outlets is that the vertical flow of gas through a vertical gas outlet travels quickly though the glass melt which does not allow efficient heat transfer and can contribute to burners flinging glass melt and batch upwards into the SCM.

Burner 2, with intermediate sized gas outlets, can be optimized by enlarging the respective central feed bore communicating the upper gas outlets with the interior of the central tube, possibly to a diameter of 0.437 inch, into which a 0.397 inch inner diameter tube can be placed. To further increase this passage size the overall outer diameter of the burner tip may need to be increased. As noted in Table 1, Burner 4 possessed eight pairs of gas outlets relatively large in diameter and similar to Burner 3. Burner 4 was not tested, but calculations indicate that such a nozzle would result in a capacity of over 320 KW at an oxygen delivery pressure of 16 psig and over 450 KW at an oxygen delivery pressure of 35 psig.

Figure 13:
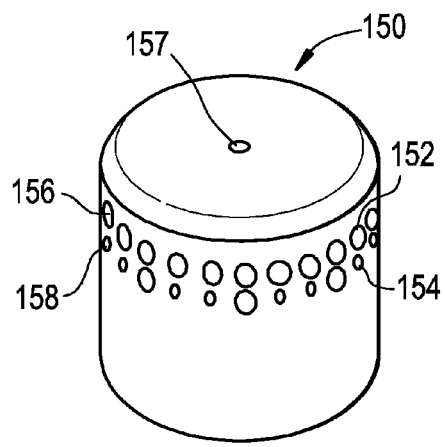
FIG. 13 is a perspective view of an exemplary nozzle according to another embodiment of the present disclosure.
Figure 14:
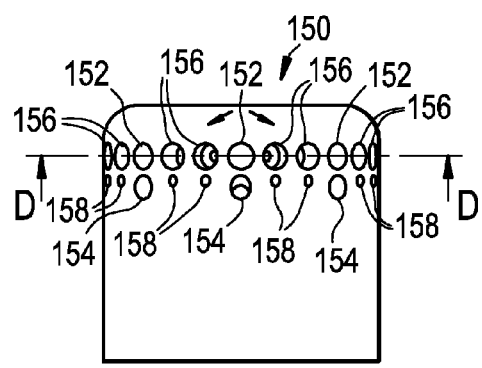
FIG. 14 is a side view of the nozzle of FIG. 13.
Figure 15:
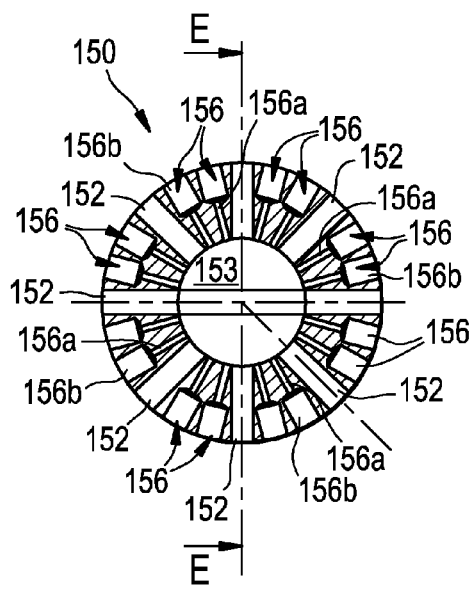
FIG. 15 is a cross-sectional view of the nozzle of FIG. 14 taken along line D-D.
Figure 16:
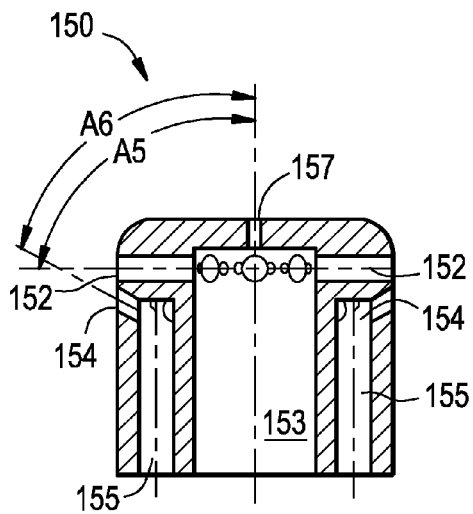
FIG. 16 is a cross-sectional view of the nozzle of FIG. 15 taken along line E-E.

FIG. 13 is a perspective view of a nozzle according to another embodiment of the present disclosure, FIG. 14 is a side view of the nozzle of FIG. 13, FIG. 15 is a cross-sectional view of the nozzle of FIG. 14 taken along line D-D, and FIG. 16 is a cross-sectional view of the nozzle of FIG. 15 taken along line E-E. With reference to FIGS. 13-16, a substantially cylindrical nozzle 150 embodiment is illustrated. The illustrated nozzle 150 includes eight pairs of upper and lower gas outlets 152, 154 for generating flames flaring out and away from the nozzle 150 as previously described above. The upper gas outlets 152 can be formed along a first egress angle A5 of approximately 90° from the longitudinal axis of the central tube 112. The lower gas outlets 154 can be formed along a second egress angle A6 of approximately 60° from the longitudinal axis of the central tube 112, such that the upper and lower gas outlets converge at a convergence angle of approximately 30°. The aforementioned egress and convergence angles are, of course, exemplary only and should not limit the scope of the claims appended herewith as any angle of egress angles A5, A6 and/or convergence angles are envisioned with embodiments of the present disclosure. The upper and lower gas outlets 152, 154 are of comparable diameter/size as the gas outlets in the previously described nozzles above; however, the depicted nozzle 150 does not possess a frustoconical section. Rather, the upper and lower gas outlets in the nozzle 150 are located in a cylindrical outer surface/wall thereof. In another embodiment, the nozzle 150 can include a plurality (in this case, sixteen) pairs of upper and lower pilot holes 156, 158 for generating pilot flames.

In exemplary embodiments, the pilot holes, 156, 158 can have a substantially similar diameter along the length thereof but can be smaller in comparison to the upper and lower outlets. In another embodiment, the pilot holes 156, 158 can have a smaller diameter closest the longitudinal axis of the nozzle and a progressively (or stepped) larger diameter at the surface of the nozzle to thereby slow the gas velocity thereof and make the pilot flame more effective. For example, to reduce the velocity of the first gas exiting the upper pilot holes 156, the upper pilot holes 156 can be formed with relatively small diameter inner bore portions 156a and relatively large diameter outer bore portions 156b (FIG. 15). Proximate sections of the inner bore portions 156a are in communication with a central gas feed bore 153 in the nozzle 150 that is in communication with the interior of the central tube 112. Proximate sections of the outer bore portions 156b are in communication with distal sections of the inner bore portions 156a whereby the distal sections of the outer bore portions 156b exit the nozzle 150. The relatively small diameter of the inner bore portions 156a can act to limit the flow of the first gas through the upper pilot holes 156 and limit the expansion of the first gas when travelling from the smaller diameter inner bore portions 156A to the larger diameter outer bore portions 156b by lowering the velocity of the first gas exiting the upper pilot holes 156. As a result, the velocity of the first gas through the upper pilot holes is lower and the pilot flames are more resistant to blowing out than are the relatively high velocity primary flame gas at high flow rates. The nozzle 150 can also provide an additional first gas top or vertical pilot outlet 157. A vertical pilot outlet 157 can serve as a port through which a UV sensor (not shown) can detect UV energy from the flame emitted from the nozzle and monitor the operation of the burner.

Similar to the previously described embodiments, the egress angle of the upper gas outlets 152, the egress angle of the lower gas outlets 154, and the resulting angle of convergence of the gas outlets to each other can vary. By way of non-limiting examples, the first egress angle A5 of the upper gas outlet can be in a range of from about 45° to about 90°. The second egress angle A6 of the lower gas outlets can be in a range of from about 40° to about 90°. It follows, that with the aforementioned ranges of A5, A6, the convergence angle of the upper and lower gas outlets can be in a range of from about 0° to about 50°. In a preferred embodiment, the convergence angle of the upper and lower gas outlets can be from about 10° to about 45°. In yet another embodiment, the convergence angle of the upper and lower gas outlets can be from about 15° to about 45°. The first and second gas outlets can also be provided with a lateral angle from the longitudinal axis of the nozzle, e.g., have a horizontal component to reduce vertical component of the momentum of gases being emitted. For example, a lateral aspect of the egress angles of the upper gas outlets and the lower gas outlets can be about 10° from or toward each other. As in the previously described embodiments, the size of the upper gas outlets, the lower gas outlets, the upper pilot holes and the lower pilot holes can also vary, and any suitable number or size of gas outlets and pilot holes are envisioned for embodiments of the present disclosure.

Figure 17:
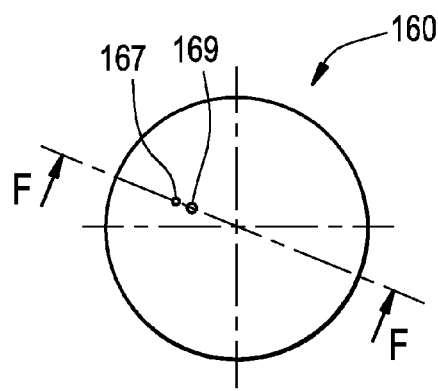
FIG. 17 is a top view of an exemplary nozzle according to a further embodiment of the present disclosure.
Figure 18:
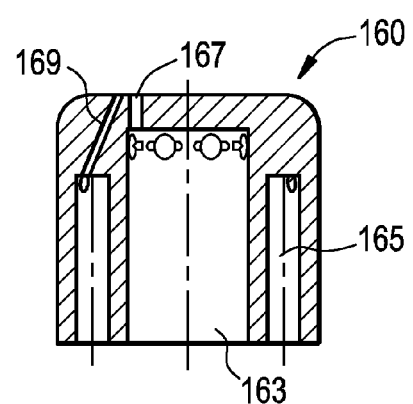
FIG. 18 is a cross-sectional view of the nozzle of FIG. 17 taken along line F-F.

FIG. 17 is a top view of a nozzle according to a further embodiment of the present disclosure, and FIG. 18 is a cross-sectional view of the nozzle of FIG. 17 taken along line F-F. With reference to FIGS. 17 and 18, an exemplary nozzle 160 is illustrated similar to the nozzle 150 of the previously described embodiments depicted in FIGS. 13-16 but with an additional vertical pilot hole 167 in the nozzle 160 formed by an off-center bore in the top or end face of the nozzle 160. A center first gas feed bore 163 communicates the additional vertical pilot hole 167 with the interior of the central tube 112. A further vertical pilot hole 169 can also be formed by a bore in the top or end face of the nozzle 150 which communicates with a second gas feed bore or channel 169a in the nozzle 160. The second gas feed channel 169a communicates the additional vertical pilot holes 169 with the annular space 116 inside the outer tube 114. The bores forming the second gas top pilot hole 169 and the first vertical pilot hole 167 can be inclined toward each other so that a stream of the first gas exiting the first vertical pilot hole 167 impinges and mixes with a stream of the second gas exiting the second vertical pilot hole 169 to combust and generate a pilot flame out the top or end or face of the nozzle 160. The vertical pilot hole 167 can also serve as a port through which a UV sensor (not shown) can detect UV energy from the flame emitted from the nozzle and monitor the operation of the burner.

Figure 19:
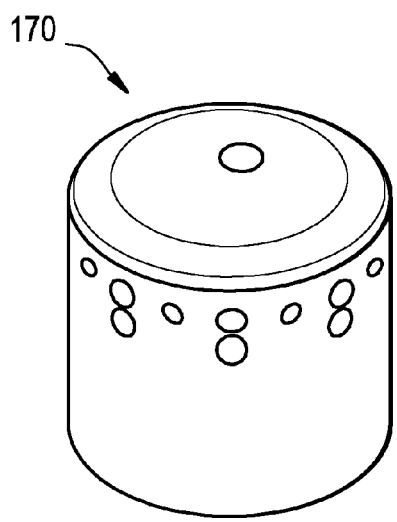
FIG. 19 is a perspective view of an exemplary nozzle according to an additional embodiment of the present disclosure.
Figure 20:
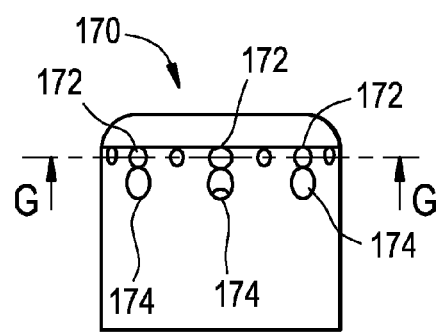
FIG. 20 is a side view of the nozzle of FIG. 19.
Figure 21:
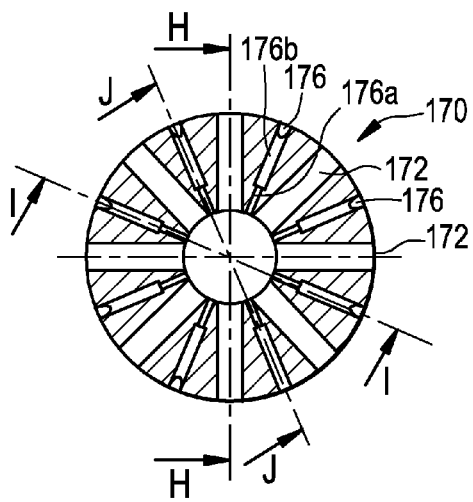
FIG. 21 is a cross-sectional view of the nozzle of FIG. 20 taken along line G-G.
Figure 22:
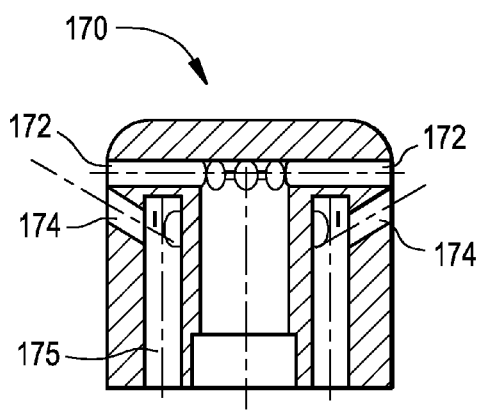
FIG. 22 is a cross-sectional view of the nozzle of FIG. 21 taken along line H-H.
Figure 23:
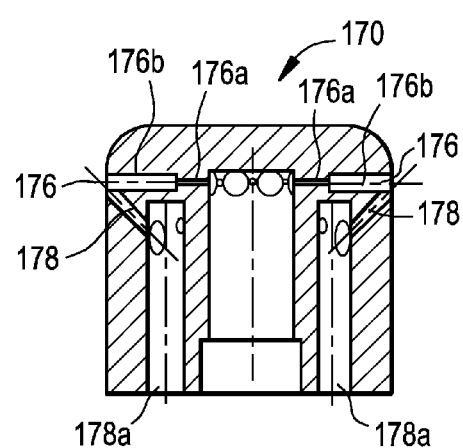
FIG. 23 is a cross-sectional view of the nozzle of FIG. 21 taken along line I-I.
Figure 24:
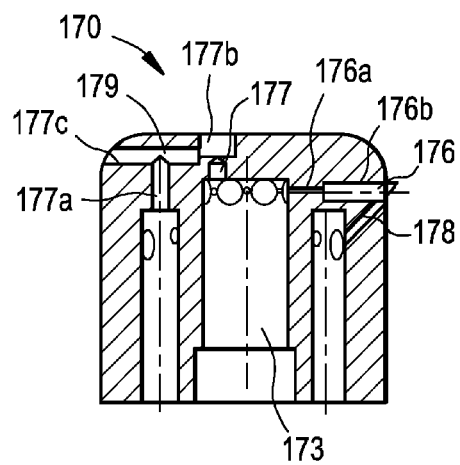
FIG. 24 is a cross-sectional view of the nozzle of FIG. 21 taken along line J-J.

FIG. 19 is a perspective view of a nozzle according to an additional embodiment of the present disclosure, and FIG. 20 is a side view of the nozzle of FIG. 19. FIG. 21 is a cross-sectional view of the nozzle of FIG. 20 taken along line G-G, FIG. 22 is a cross-sectional view of the nozzle of FIG. 21 taken along line H-H, FIG. 23 is a cross-sectional view of the nozzle of FIG. 21 taken along line I-I, and FIG. 24 is a cross-sectional view of the nozzle of FIG. 21 taken along line J-J. With reference to FIGS. 19-24, an exemplary nozzle 170 is illustrated similar to the nozzle 160 depicted in FIGS. 17-18 but with eight pairs of upper and lower gas outlets 172, 174 and seven pairs of second gas and first gas pilot holes 176, 178 in the outer peripheral surface of the cylindrical nozzle 170. As illustrated in FIG. 23, the bores forming the first and second gas pilot holes 176, 178 completely intersect at the peripheral/outer side surface of the nozzle 170. Using this exemplary embodiment, the first and second gasses can be mixed and combusted proximate and substantially adjacent to the outer surface of the nozzle 170. In further embodiments of the present disclosure, the bores forming the first gas vertical pilot hole 177 and the second gas vertical pilot hole 179 intersect just inside the outer surface of the nozzle 170 (FIG. 24), such that the first and second gases therefrom are quickly mixed inside the burner, or at least closer to the outer surface of the nozzle 170 than in the previously described embodiments. In such an embodiment the bore forming the second gas vertical pilot hole 179 can be formed of two bores, a longitudinal bore 177a and a horizontal bore 177b, for ease of manufacture. A plug 177c can also be employed to seal the outer end of the horizontal bore 177b. To reduce the velocity of the first gas exiting the first gas vertical pilot hole 177, the additional first gas pilot hole 177 can be formed with a relatively small diameter inner bore section 177a and relatively large diameter outer bore section 177b (FIG. 24). The bore diameter can be stepped from the inner to outer sections or can progress in diameter as applicable. Likewise, the upper pilot holes 176 can be formed with a first relatively small diameter inner bore section 176a and relatively large diameter outer bore section 176b (FIG. 23). The bore diameter can be stepped from the inner to outer sections or can progress in diameter as applicable. The resultant pilot flames from such embodiments are resistant to blowing out and can ensure that the primary flames do not blow out by re-ignition thereof.

Figure 25:
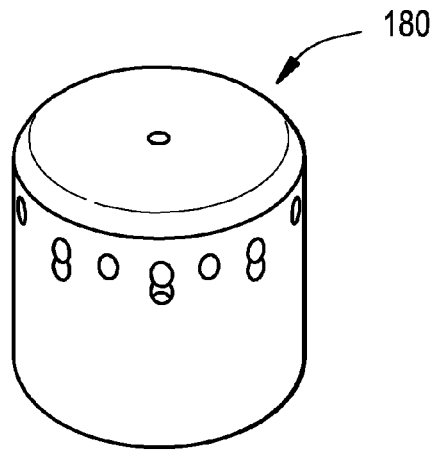
FIG. 25 is a perspective view of an exemplary nozzle according to yet a further embodiment of the present disclosure.
Figure 26:
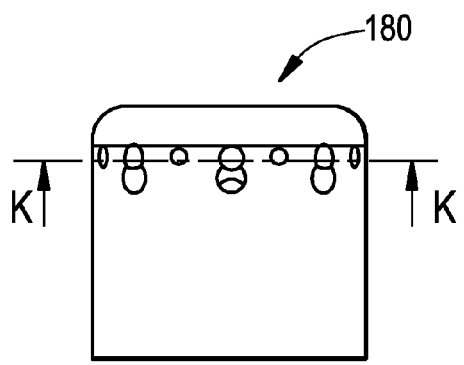
FIG. 26 is a side view of the nozzle of FIG. 25.
Figure 27:
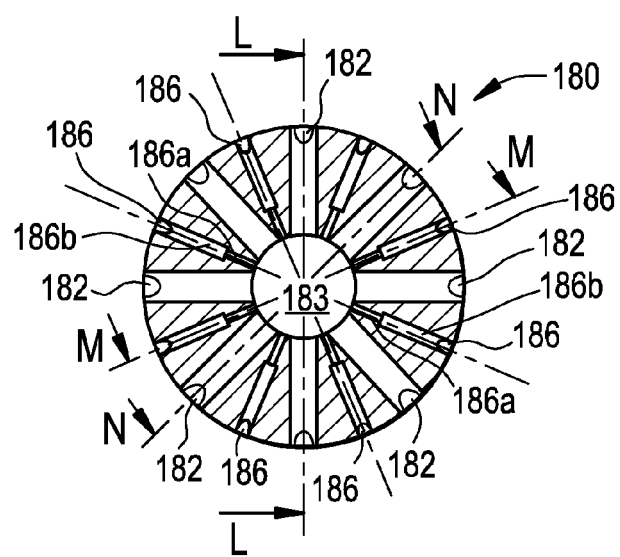
FIG. 27 is a cross-sectional view of the nozzle of FIG. 26 taken along line K-K.
Figure 28:
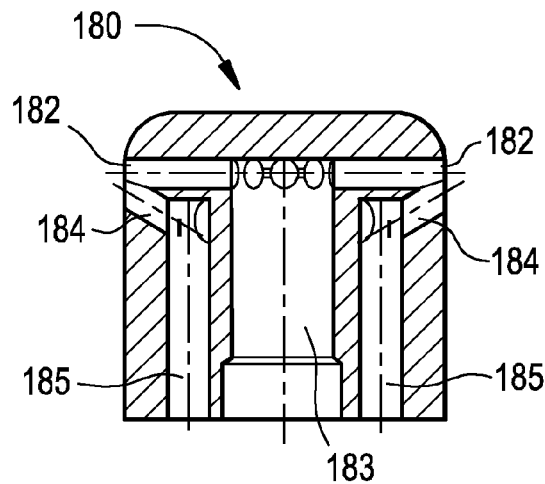
FIG. 28 is a cross-sectional view of the nozzle of FIG. 26 taken along line L-L.
Figure 29:
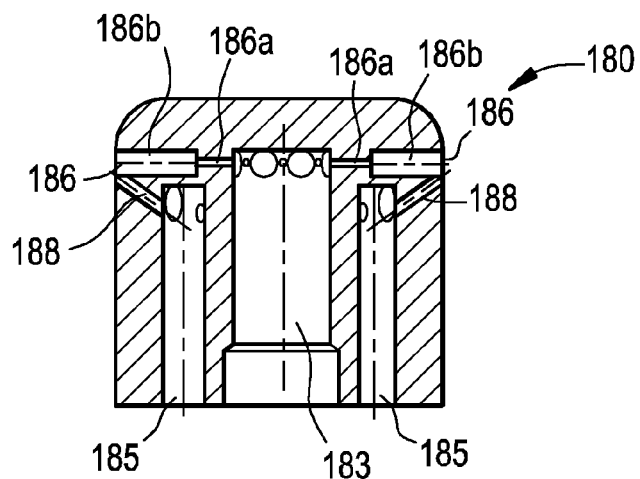
FIG. 29 is a cross-sectional view of the nozzle of FIG. 26 taken along line M-M.
Figure 30:
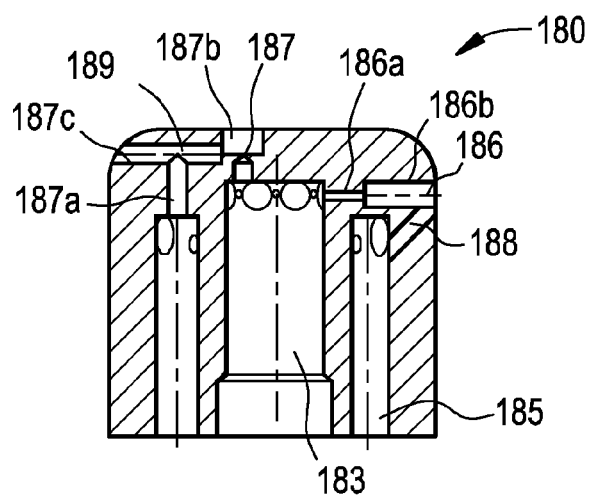
FIG. 30 is a cross-sectional view of the nozzle of FIG. 26 taken along line N-N.

FIG. 25 is a perspective view of a nozzle according to yet a further embodiment of the present disclosure, FIG. 26 is a side view of the nozzle of FIG. 25, FIG. 27 is a cross-sectional view of the nozzle of FIG. 26 taken along line K-K, FIG. 28 is a cross-sectional view of the nozzle of FIG. 26 taken along line L-L, FIG. 29 is a cross-sectional view of the nozzle of FIG. 26 taken along line M-M, and FIG. 30 is a cross-sectional view of the nozzle of FIG. 26 taken along line N-N. With reference to FIGS. 25-30, an exemplary nozzle 180 is illustrated similar to the nozzle 170 depicted in FIGS. 17-18 but with eight pairs of upper and lower gas outlets 182, 184 and seven pairs of first and second gas pilot holes 186, 188. As illustrated in FIGS. 26 and 28, the bores forming the upper gas outlets 182 partly intersect with the bores forming the lower gas outlets 184 at the outer surface of the nozzle 180. With such an embodiment, the first and second gasses are quickly mixed and combusted to thereby produce a flame close to the nozzle 180. Similarly, the bores forming the first gas pilot holes 186 completely intersect the second gas pilot holes 188 at a side surface of the nozzle 180 as shown in FIG. 29. With such an embodiment, the first and second gas can be quickly mixed and combusted to thereby produce a flame close to the nozzle 180. Such embodiments result in a pilot flame which ensures that the primary flames do not blow out through re-ignition thereof. As shown in FIG. 30, an additional first gas top or end pilot hole 187 can be formed by a bore formed off-center in the top or end face of the nozzle 150 that communicates with the center bore 186 in the nozzle 180. The center feed bore 183 communicates the first gas top pilot hole with the interior of the central tube 112. An additional second gas top pilot hole 189 can be formed by a bore in the center of the top or end face of the nozzle 180 that communicates with a feed channel 187 in the nozzle 180 that communicates with the interior of the outer tube 114.

As previously noted, the sizes of the gas outlets and pilot holes in the nozzles of the previously described embodiments of FIGS. 13-30 can vary. Exemplary diameters and configurations for the gas outlets of the nozzles of FIGS. 13-30 are given in Table 2 below. Exemplary diameters and configurations for the pilot holes of the nozzles of FIGS. 13-30 are given in Table 3 below.

TABLE 2

| Burner # | First Gas Outlet # | First Gas Outlet Diameter (in) | Second Gas Outlet # | Second Gas Outlet Diameter (in) | Outlet Angle |
|---|---|---|---|---|---|
| 150 | 8 | 0.125 | 8 | 0.0995 | 60 |
| 160 | 8 | 0.125 | 8 | 0.089 | 60 |
| 170 | 8 | 0.081 | 8 | 0.1405 | 60 |
| 180 | 8 | 0.081 | 8 | 0.1405 | 68 |

TABLE 3

| Burner # | First Pilot # | First Pilot Outer Diameter (in) | First Pilot Inner Diameter (in) | Second Pilot # | Second Pilot Diameter (in) | Pilot Hole Angle |
|---|---|---|---|---|---|---|
| 150 | 16 | 0.125 | 0.0465 | 16 | 0.0465 | 60 |
| 160 | 16 | 0.125 | 0.0465 | 16 | 0.042 | 60 |
| 170 | 7 | 0.081 | 0.035 | 7 | 0.052 | 45 |
| 180 | 7 | 0.081 | 0.035 | 7 | 0.052 | 45 |

Mixed gas exiting exemplary nozzles can be ignited such that flames are generated travelling away from the nozzle within the glass melt in a direction between the first and second egress angles and such that the flames flare out away from the central axis of the central tube. This flaring can cause the momentum of the combustion gases to be more horizontal, diffused and spread out in the glass melt as compared to conventional SCM burners thereby reducing the vertical velocity and momentum of the combustion gases travelling through the glass melt and also reducing any flinging of the glass described above. As previously noted, the upper, lower gas outlets as well as the pilot holes can be used in any of the preceding embodiments and the gas outlet pairs and pilot hole pairs that overlap or intersect at or just below the outer surface of the nozzle and the top pilot holes can also be used in any of the preceding embodiments to produce flames closely adjacent to the nozzle. Thus, the depicted embodiments are exemplary only and should not so limit the scope of the claims appended herewith.

Some embodiments of the present disclosure include a burner for a submerged combustion melter. The burner can include a first tube having a sealed distal end, a second tube concentric to the first tube, the second tube having a partially sealed distal end with an opening for receiving the first tube, where an annular space is defined between the first and second tubes. The burner can also include a first gas port in the sealed distal end of the first tube, the first gas port supplying a first gas, a second gas port in a distal end of the second tube, the second gas port supplying a second gas to the annular space, and a nozzle on the proximate ends of the first and second tubes. An exemplary first gas can be a fuel and an exemplary second gas can be an oxidizer. The nozzle can have a frustoconical, cylindrical or other suitable geometric shape. The nozzle can also include one or more pilot holes formed therein as discussed above. The first gas can be delivered at a different or the same flow rate than the second gas.

The nozzle can have N first gas outlets and M second gas outlets whereby the N first gas outlets supply either the first or the second gas into a molten glass environment external the burner, and the M second gas outlets supply either the second or the first gas into the molten glass environment external the burner to thereby mix and combust the first and second gases together in the molten glass environment. In some embodiments, N can be equal to or different than M. Exemplary non-limiting integers for N and M include one, two, three, four, five, six, seven, and eight. In another embodiment, the first and second gas outlets can be arranged in a plurality of gas outlet pairs with a gas outlet pair including a first gas outlet and an adjacent second gas outlet distal the first gas outlet. The first gas outlet can be inclined from a longitudinal axis of the first tube by an angle of between about 20° to about 80°, and/or the second gas outlet is inclined from a longitudinal axis of the first tube by an angle of between about 10° to about 70°. Further, a convergence angle of the first and second gas outlets toward or away from each other can be from about 0° to about 60°. Exemplary N first and M second gas outlets can be formed by respective bores through the nozzle as discussed above whereby a distal end of at least one bore has a different diameter than a proximate end of the same bore. Further as noted above, the first and second gas outlets can be concentrically arranged about a longitudinal axis of the first tube, the second gas outlets distal the first gas outlets. In some embodiments, the diameter of ones of the N first gas outlets are different from each other and/or the diameter of ones of the M second gas outlets are different from each other. In other embodiments, the diameter of ones of the M second gas outlets are different from the diameter of ones of the N first gas outlets. In yet another embodiment, an approximate centerline of the supplied first gas and an approximate centerline of the supplied second gas has a weighted average centerline inclined at least 20°, 40° or 60° from the longitudinal axis of the first tube Additional embodiments of the present disclosure include another burner for a submerged combustion melter. The burner can have a first tube having a sealed distal end, a second tube concentric to the first tube, the second tube having a partially sealed distal end with an opening for receiving the first tube, where an annular space is defined between the first and second tubes. The burner can also include a first gas port in the sealed distal end of the first tube, the first gas port supplying a first gas, a second gas port in a distal end of the second tube, the second gas port supplying a second gas to the annular space, and a nozzle on the proximate ends of the first and second tubes. In some embodiments, the fuel can be delivered at a different flow rate than the oxidizer. In additional embodiments, an approximate centerline of the delivered fuel and an approximate centerline of the delivered oxygen can have a weighted average centerline included at least 20° from the longitudinal axis of the first tube.

An exemplary nozzle can include one or more first gas outlets for delivering a fuel to a molten glass environment and one or more second gas outlets for delivering an oxidizer to the molten glass environment where at least one of the first or second gas outlets is inclined by more than 30° from a longitudinal axis of the first tube. In some embodiments, the first and second gas outlets can be arranged around a longitudinal central axis of the first tube, the second gas outlets being distal the first gas outlets. In another embodiment, the first and second gas outlets are arranged in a plurality of gas outlet pairs with a gas outlet pair including a first gas outlet and an adjacent second gas outlet distal the first gas outlet. The first gas outlet can be inclined from a longitudinal axis of the first tube by an angle of between about 20° to about 80°, and/or the second gas outlet is inclined from a longitudinal axis of the first tube by an angle of between about 10° to about 70°. Further, a convergence angle of the first and second gas outlets toward or away from each other can be from about 0° to about 60°. In additional embodiments, the first and second gas outlets in a gas outlet pair are within approximately 0.1 inches of each other. Further, in some embodiments, the fuel or the oxidizer can leave the respective first or second gas outlets at a velocity of greater than 100 m/s, 200 m/s or 250 m/s. Each of the first and second gas outlets can be formed by respective bores through the nozzle where a distal end of at least one bore has a different diameter than a proximate end of the same bore.

Further embodiments of the present disclosure include an additional burner for a submerged combustion melter. This burner can include a first tube having a sealed distal end, a second tube concentric to the first tube, the second tube having a partially sealed distal end with an opening for receiving the first tube, where an annular space is defined between the first and second tubes. The burner can also have a first gas port in the sealed distal end of the first tube, the first gas port supplying a first gas, a second gas port in a distal end of the second tube, the second gas port supplying a second gas to the annular space, and a nozzle on the proximate ends of the first and second tubes.

The nozzle can have a first plurality of gas outlets for delivering a fuel to a molten glass environment and a second plurality of gas outlets for delivering an oxidizer to the molten glass environment where each of the first plurality of gas outlets are inclined by more than 30° from a longitudinal axis of the first tube and each of the second plurality of gas outlets are inclined by more than 30° from the longitudinal axis of the first tube. In some embodiments, each of the first and second plurality of gas outlets are arranged in gas outlet pairs with a gas outlet pair including a gas outlet from the first plurality and a gas outlet from the second plurality of gas outlets. In other embodiments, the fuel can be delivered at a different flow rate than the oxidizer. Further, gas outlet pairs can deliver fuel and oxidizer at different flow rates. In additional embodiments, each of the first and second gas outlets can be formed by respective bores through the nozzle where a distal end of at least one bore has a different diameter than a proximate end of the same bore. In another embodiment, the burner can include a flame sensor on the nozzle. In yet a further embodiment, an approximate centerline of the delivered fuel and an approximate centerline of the delivered oxygen can have a weighted average centerline inclined at least 20° from the longitudinal axis of the first tube.

Yet another embodiment of the present disclosure provides a submerged combustion melter system. The system can include a melting chamber having a molten pool of glass melt, a feed port for feeding glass material into the melting chamber, an exhaust port through which exhaust gases can escape the melting chamber, a conditioning chamber operably connected to the melting chamber by an outlet passage whereby molten material from the molten pool flows from the melting chamber to the conditioning chamber through the outlet passage and then exits the melting apparatus, and one or more burners constrained in a wall of the melting chamber to inject flames into the molten pool of glass melt. Exemplary burners can include a first tube having a sealed distal end and a second tube concentric to the first tube, the second tube having a partially sealed distal end with an opening for receiving the first tube, wherein an annular space is defined between the first and second tubes. The burner can also include a first gas port in the sealed distal end of the first tube, the first gas port supplying a first gas, a second gas port in a distal end of the second tube, the second gas port supplying a second gas to the annular space, and a nozzle on the proximate ends of the first and second tubes. An exemplary nozzle can include a first plurality of first gas outlets and a second plurality of second gas outlets, where the plural first gas outlets supply either the first or the second gas, the plural second gas outlets supply either the second or the first gas to thereby mix the first and second gases together, and at least one of the plural first or second gas outlets is inclined by more than 30° from a longitudinal axis of the first tube.

While this description may include many specifics, these should not be construed as limitations on the scope thereof, but rather as descriptions of features that may be specific to particular embodiments. Certain features that have been heretofore described in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and may even be initially claimed as such, one or more features from a claimed combination may in some cases be excised from the combination, and the claimed combination may be directed to a subcombination or variation of a subcombination.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing may be advantageous.

As shown by the various configurations and embodiments illustrated in FIGS. 1-30, various embodiments for submerged combustion melters and burners therefor have been described.

While preferred embodiments of the present disclosure have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. A burner for a submerged combustion melter comprising:
   a first tube having a sealed distal end;
   a second tube concentric to the first tube, the second tube having a partially sealed distal end with an opening for receiving the first tube, wherein a substantially annular space is defined between the first and second tubes;
   a first gas port in the sealed distal end of the first tube, the first gas port supplying a first gas;
   a second gas port in a distal end of the second tube, the second gas port supplying a second gas to the substantially annular space; and
   a nozzle on the proximate ends of the first and second tubes, the nozzle having:
   N first gas outlets,
   M second gas outlets;
   wherein the N first gas outlets supply either the first or the second gas into a molten glass environment external the burner, and
   wherein the M second gas outlets supply either the second or the first gas into the molten glass environment external the burner to thereby mix and combust the first and second gases together in the molten glass environment, and
   wherein the second gas outlet is inclined from a longitudinal axis of the first tube by an angle of between about 10° to about 70°.

2. The burner of claim 1, wherein N=M.

3. The burner of claim 1, wherein N and M are each selected from an integer in the group consisting of one, two, three, four, five, six, seven, eight.

4. The burner of claim 1, wherein the first gas is a fuel and the second gas is an oxidizer.

5. The burner of claim 1, wherein the first and second gas outlets are arranged in a plurality of gas outlet pairs with a gas outlet pair including a first gas outlet and an adjacent second gas outlet distal the first gas outlet.

6. The burner of claim 1, wherein the first gas outlet is inclined from a longitudinal axis of the first tube by an angle of between about 20° to about 80°.

7. The burner of claim 1, wherein the second gas outlet is inclined from a longitudinal axis of the first tube by an angle of between about 10° to about 70°, and a convergence angle of the first and second gas outlets toward or away from each other is from 0° to about 60°.

8. The burner of claim 1, wherein each of the N first and M second gas outlets are formed by respective bores through the nozzle and wherein a distal end of at least one bore has a different diameter than a proximate end of the same bore.

9. The burner of claim 1, wherein the first and second gas outlets are concentrically arranged about a longitudinal axis of the first tube, the second gas outlets distal the first gas outlets.

10. The burner of claim 1, wherein the nozzle is frusto-conical or cylindrical.

11. The burner of claim 1, wherein the nozzle includes one or more pilot holes formed therein.

12. The burner of claim 1, wherein the diameter of ones of the N first gas outlets are different from each other.

13. The burner of claim 1, wherein the diameter of at least one of the M second gas outlets are different from the other M second gas outlets.

14. The burner of claim 1, wherein the diameter of at least one of the M second gas outlets are different from the diameter of at least one of the N first gas outlets.

15. The burner of claim 1, wherein the first gas is delivered at a different flow rate than the second gas.

16. The burner of claim 1, wherein an approximate centerline of the supplied first gas and an approximate centerline of the supplied second gas has a weighted average centerline inclined at least 20° from the longitudinal axis of the first tube.

17. A burner for a submerged combustion melter comprising:
a first tube having a sealed distal end;
a second tube concentric to the first tube, the second tube having a partially sealed distal end with an opening for receiving the first tube, wherein a substantially annular space is defined between the first and second tubes;
a first gas port in the sealed distal end of the first tube, the first gas port supplying a first gas;
a second gas port in a distal end of the second tube, the second gas port supplying a second gas to the substantially annular space; and
a nozzle on the proximate ends of the first and second tubes, the nozzle having:
one or more first gas outlets for delivering a fuel to a molten glass environment,
one or more second gas outlets for delivering an oxidizer to the molten glass environment,
wherein at least one of the first or second gas outlets is inclined by more than 30° from a longitudinal axis of the first tube, and
wherein the second gas outlet is inclined from a longitudinal axis of the first tube by an angle of between about 10° to about 70°.

18. The burner of claim 17, wherein the first and second gas outlets are arranged around a longitudinal central axis of the first tube, the second gas outlets being distal to the first gas outlets.

19. The burner of claim 17, wherein the first and second gas outlets are arranged in a plurality of gas outlet pairs with a gas outlet pair including a first gas outlet and an adjacent second gas outlet distal to the first gas outlet.

20. The burner of claim 17, wherein the first gas outlet is inclined from a longitudinal axis of the first tube by an angle of between about 20° to about 80°.

21. The burner of claim 17, wherein the second gas outlet is inclined from a longitudinal axis of the first tube by an angle of between about 10° to about 70°, and a convergence angle of the first and second gas outlets toward or away from each other is from 0° to about 60°.

22. The burner of claim 19, wherein the first and second gas outlets in a gas outlet pair are within approximately 0.1 inches of each other.

23. The burner of claim 17, wherein the fuel or the oxidizer leaves the respective first or second gas outlets at a velocity of greater than 100 m/s, 200 m/s or 250 m/s.

24. The burner of claim 17, wherein the fuel is delivered at a different flow rate than the oxidizer.

25. The burner of claim 17, wherein each of the first and second gas outlets are formed by respective bores through the nozzle and wherein a distal end of at least one bore has a different diameter than a proximate end of the same bore.

26. The burner of claim 17, wherein an approximate centerline of the delivered fuel and an approximate centerline of the delivered oxygen has a weighted average centerline included at least 20° from the longitudinal axis of the first tube.

27. A burner for a submerged combustion melter comprising:
a first tube having a sealed distal end;
a second tube concentric to the first tube, the second tube having a partially sealed distal end with an opening for receiving the first tube, wherein a substantially annular space is defined between the first and second tubes;
a first gas port in the sealed distal end of the first tube, the first gas port supplying a first gas;
a second gas port in a distal end of the second tube, the second gas port supplying a second gas to the substantially annular space; and
a nozzle on the proximate ends of the first and second tubes, the nozzle having:
a first plurality of gas outlets for delivering a fuel to a molten glass environment,
a second plurality of gas outlets for delivering an oxidizer to the molten glass environment,
wherein each of the first plurality of gas outlets are inclined by more than 30° from a longitudinal axis of the first tube and each of the second plurality of gas outlets are inclined by more than 30° from the longitudinal axis of the first tube.

28. The burner of claim 27, wherein each of the first and second plurality of gas outlets are arranged in gas outlet pairs with a gas outlet pair including a gas outlet from the first plurality and a gas outlet from the second plurality of gas outlets.

29. The burner of claim 27, wherein the fuel is delivered at a different flow rate than the oxidizer.

30. The burner of claim 28, wherein gas outlet pairs deliver fuel and oxidizer at different flow rates.

31. The burner of claim 27, wherein each of the first and second gas outlets are formed by respective bores through the nozzle and wherein a distal end of at least one bore has a different diameter than a proximate end of the same bore.

32. The burner of claim 27, wherein the burner further comprises a flame sensor on the nozzle.

33. The burner of claim 27, wherein an approximate centerline of the delivered fuel and an approximate centerline of the delivered oxygen has a weighted average centerline included at least 20° from the longitudinal axis of the first tube.

34. A submerged combustion melter system comprising:
   a melting chamber having a molten pool of glass melt;
   a feed port for feeding glass material into the melting chamber;
   an exhaust port through which exhaust gases can escape the melting chamber;
   a conditioning chamber operably connected to the melting chamber by an outlet passage whereby molten material from the molten pool flows from the melting chamber to the conditioning chamber through the outlet passage and then exits the melting apparatus; and
   one or more burners constrained in a wall of the melting chamber to inject flames into the molten pool of glass melt,
   wherein the burner includes a first tube having a sealed distal end;
      a second tube concentric to the first tube, the second tube having a partially sealed distal end with an opening for receiving the first tube, wherein an annular space is defined between the first and second tubes;
      a first gas port in the sealed distal end of the first tube, the first gas port supplying a first gas;
      a second gas port in a distal end of the second tube, the second gas port supplying a second gas to the annular space; and
      a nozzle on the proximate ends of the first and second tubes, the nozzle having:
      a first plurality of first gas outlets,
      a second plurality of second gas outlets;
   wherein the plural first gas outlets supply either the first or the second gas,
   wherein the plural second gas outlets supply either the second or the first gas to thereby mix the first and second gases together, and
   wherein at least one of the plural first or second gas outlets is inclined by more than 30° from a longitudinal axis of the first tube.

* * * * *